United States Patent
Gadey NV et al.

(10) Patent No.: US 10,254,821 B2
(45) Date of Patent: Apr. 9, 2019

(54) MANAGING SURPRISE HOT PLUG IN LOW POWER STATE

(71) Applicant: Intel Corporation, Santa Clara, CA (US)

(72) Inventors: K. L. Siva Prasad Gadey NV, Bangalore (IN); Samit Mehrotra, Santa Clara, CA (US); Eric Wehage, Tenino, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/666,229

(22) Filed: Aug. 1, 2017

(65) Prior Publication Data

US 2019/0041964 A1 Feb. 7, 2019

(51) Int. Cl.
| | | |
|---|---|---|
| *G06F 1/16* | (2006.01) |
| *G06F 1/32* | (2006.01) |
| *G06F 13/40* | (2006.01) |
| *G06F 13/42* | (2006.01) |
| *G06F 1/3287* | (2019.01) |
| *G06F 1/3296* | (2019.01) |

(52) U.S. Cl.
 CPC .......... *G06F 1/3287* (2013.01); *G06F 1/1632* (2013.01); *G06F 1/3296* (2013.01); *G06F 13/4081* (2013.01); *G06F 13/4282* (2013.01); *G06F 2213/0026* (2013.01)

(58) Field of Classification Search
CPC ........................... H04L 43/0882; G06F 1/3231
USPC ....................................................... 710/304
See application file for complete search history.

(56) References Cited

U.S. PATENT DOCUMENTS

| | | | | |
|---|---|---|---|---|
| 2006/0129733 | A1* | 6/2006 | Sobelnnan | .......... H04L 25/0262 710/305 |
| 2008/0046624 | A1 | 2/2008 | Rubin et al. | |
| 2008/0148295 | A1* | 6/2008 | Freimuth | .............. G06F 9/4856 719/324 |
| 2012/0072633 | A1 | 3/2012 | Elboim | |
| 2012/0166691 | A1 | 6/2012 | Song et al. | |
| 2013/0311680 | A1* | 11/2013 | Bolen | ................... G06F 9/4411 710/8 |
| 2016/0132395 | A1* | 5/2016 | Bolen | ................... G06F 11/141 714/5.11 |
| 2016/0147697 | A1 | 5/2016 | Arroyo et al. | |
| 2017/0286349 | A1* | 10/2017 | Edirisooriya | ....... G06F 13/4282 |

(Continued)

OTHER PUBLICATIONS

PCI Express Base Specification, Revision 1.1, 2005 Mar. 28, PCI-SIG.*

(Continued)

*Primary Examiner* — Faisal M Zaman
(74) *Attorney, Agent, or Firm* — Green, Howard & Mughal LLP (57) ABSTRACT

An apparatus is provided which comprises: an input/output (I/O) port; a first circuitry to update an in-band presence detect field, based on communication via an in-band channel; a second circuitry to update an out-of-band presence detect field, based on communication via an out-of-band channel; and a third circuitry to update a presence detect state change field, wherein the third circuitry is to selectively ignore the out-of-band presence detect field and utilize the in-band presence detect field, while the third circuitry is to update the presence detect state change field.

20 Claims, 4 Drawing Sheets

(56) References Cited

U.S. PATENT DOCUMENTS

2018/0173664 A1* 6/2018 Am .................. G06F 13/24
2018/0300273 A1* 10/2018 Lambert ............... G06F 13/364

OTHER PUBLICATIONS

International Search Report & Written Opinion dated Nov. 16, 2018 for PCT Patent Application No. PCT/US18/40635.

* cited by examiner

MANAGING SURPRISE HOT PLUG IN LOW POWER STATE

BACKGROUND

In the Peripheral Component Interconnect Express (PCIe) ecosystem, a hot plug may refer to adding and/or removing a PCIe device to and/or from a PCIe port of a host, without powering down the host or the port. For example, hot plugging may comprise a hot add and/or a hot removal of PCIe devices. A hot plug may be software assisted (e.g., when the software may have advanced knowledge of the imminent hot plug, and has an opportunity to prepare for the hot plug). A hot plug may also be a surprise hot plug, where no advance notice is provided to the system prior to the occurrence of the hot plug.

In the PCIe ecosystem, a PCIe port may enter a low power mode (e.g., a L1 state), e.g., to save power. It may be useful that the surprise hot plug be implemented seamlessly in the regular power mode (e.g., a L0 state), as well as the low power mode of the PCIe host port.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

In some examples, while a PCIe port is in a low power state, an in-band presence detect field may not be updated in real time to reflect a surprise hot plug operation. On the other hand, while the PCIe port is in the low power state, an out-of-band presence detect field may be updated in almost real time to reflect the surprise hot plug operation. This may cause the in-band presence detect field to be out of synchronism with the out-of-band presence detect field, which may generate one or more erroneous states of the port, as discussed in further details herein later. In some embodiments, to avoid such issues, if the surprise hot plug operation is enabled for the port, the out-of-band presence detect field may be ignored, e.g., while updating a presence detect state change field. In another example, while the presence detect state change field is being asserted, the port may remain in a detect quiet state. The port may transition to a detect active state, e.g., after the presence detect state change field is cleared.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on." The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C). The terms "left," "right," "front," "back," "top," "bottom," "over," "under," and the like in the description and in the claims, if any, are used for descriptive purposes and not necessarily for describing permanent relative positions.

Figure 1:
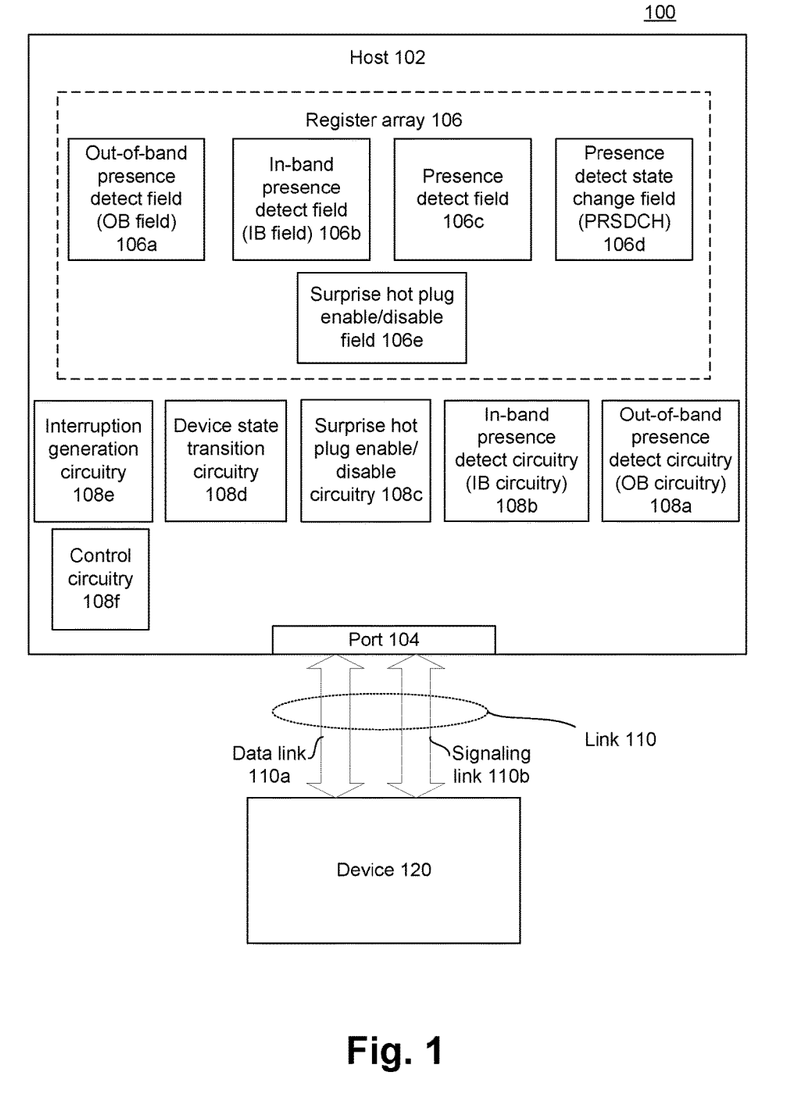
FIG. 1 schematically illustrates a host communicating with a device via a port, wherein the host is to selectively ignore an out-of-band presence detect field, according to some embodiments.

FIG. 1 schematically illustrates a host 102 communicating with a device 120 via a link 110 of a port 104, wherein the host 102 is to selectively ignore an out-of-band presence detect filed (OB field) 106a, according to some embodiments. In some embodiments, the device 120 may be removably coupled or attached to the host 102 via an Input/Output (I/O) port 104. For example, the device 120 may be attached to the port 104, detached from the port 104, and/or the like.

In some embodiments, the port 104 may be a PCIe port, although in some other embodiments, the port 104 can be any other appropriate type of port. In some embodiments, the device 120 may be a PCIe compliant device. Although various embodiments of this disclosure may be discussed assuming that the port 104 is a PCIe port, the teachings of this disclosure may be applied to other appropriate types of ports as well.

In some embodiments, the link 110 may be a PCIe link. In some embodiments, the link 110 may comprise a data link 110a (henceforth also referred to as link 110a) and a signaling link 110b (henceforth also referred to as link 110b). The link 110a may primarily communicate data between the device 120 and the host 102, and the link 110b may primarily communicate control signaling between the device 120 and the host 102. In some embodiments, the link 110b may correspond to a System Management Bus (SM-Bus).

In some embodiments, the host 102 may comprise a register array 106 to store one or more fields. For example, the register array 106 may store the out-of-band presence detect field (OB field) 106a, an in-band presence detect field (IB field) 106b, a presence detect field 106c, a presence detect state change field (PRSDCH 106d), a surprise hot plug enable/disable field 106e, and/or the like. The fields 106a, . . . , 106e may be stored in one or more registers of the register array 106.

While the fields 106a, . . . , 106e are identified by specific names in this disclosure, these fields may also be known by some other appropriate names. Merely as an example, the presence detect state change field may also be named as a presence detect change field, or the like.

In some embodiments, the host 102 may comprise an out-of-band presence detect circuitry 108a (also referred to as OB circuitry 108a, or simply as circuitry 108a). The OB circuitry 108a may detect whether the port 104 is occupied (e.g., whether a PCIe device, such as the device 120, is attached to the port 104), and may update the OB field 106a based on the detection. Merely as an example, if the OB circuitry 108a detects that a PCIe device is attached to the port 104, the OB circuitry 108a may set a value of the OB field 106a to "1"; and if the OB circuitry 108a detects that no PCIe device is attached to the port 104, the OB circuitry 108a may set the value of the OB field 106a to "0". In some embodiments, the OB circuitry 108a may detect the presence (or absence) of a PCIe device in the port 104 by monitoring an out-of-band communication path, e.g., the signaling link 110b. For example, the OB circuitry 108a may monitor (e.g., monitor intermittently, periodically, or aperiodically) the signaling link 110b, and may update the OB field 106a based on detecting the presence or absence of a PCIe device in the port 104 via the out-of-band communication link (e.g., the signaling link 110b).

In some embodiments, the OB circuitry 108a and/or the OB field 106a may not be present in all PCIe hosts. For example, some PCIe compliant hosts (e.g., the host 102) may have the OB circuitry 108a and/or the OB field 106a, while some PCIe compliant hosts may not have the OB circuitry 108a and/or the OB field 106a.

In some embodiments, the host 102 may comprise an in-band presence detect circuitry 108b (also referred to as IB circuitry 108b, or simply as circuitry 108b). The IB circuitry 108b may detect whether a PCIe device (e.g., the device 120) is attached to the port 104, and may update the D3 field 106b based on the detection. Merely as an example, if the IB circuitry 108b detects that a PCIe device is attached to the port 104, the D3 circuitry 108b may set a value of the D3 field 106b to "1"; and if the IB circuitry 108b detects that no PCIe device is attached to the port 104, the D3 circuitry 108b may set the value of the IB field 106b to "0". In some embodiments, the IB circuitry 108b may detect the presence (or absence) of a PCIe device in the port 104 by monitoring an in-band communication path, e.g., the data link 110a. For example, the IB circuitry 108b may monitor (e.g., monitor intermittently, periodically, or aperiodically) the data link 110a, and may update the IB field 106b based on detecting the presence or absence of a PCIe device in the port 104 via the in-band communication link (e.g., the data link 110a).

For purposes of this disclosure, link-up or LNKUP may refer to situations when a PCIe link of the port 104 is up and ready, the port 104 is occupied, and/or the host 102 is ready to communicate with the device 120. For purposes of this disclosure, link-down or LNKDWN may refer to situations when a PCIe link of the port 104 is down. For example, LNKDWN may occur when the port 104 is unoccupied, and/or when the port 04 is occupied but the device 104 and/or the port 104 is not ready for communication between the host 102 and the device 104.

In some embodiments, the host 102 may comprise a surprise hot plug enable/disable circuitry 108c (also referred to as circuitry 108c). For example, the circuitry 108c may dictate whether the host 102 allows surprise hot plug of devices in the port 104. For example, a hot plug may refer to adding and/or removing a PCIe device to and/or from the port 104, e.g., without powering down the host 102 or the port 104. For example, hot plugging may comprise a hot add and/or a hot removal of PCIe devices. A hot-plug may be software assisted (e.g., when the software may have advanced knowledge of the imminent hot-plug, and has an opportunity to prepare for the hot-plug). A hot plug may also be a surprise hot plug, where no advance notice is provided to the host 102 or the port 104 prior to the occurrence of the hot plug. In some embodiments, the circuitry 108c may enable or disable surprise hot plugging of PCIe devices in the port 104. For example, the circuitry 108c may set the surprise hot plug enable/disable field 106e. If the surprise hot plug enable/disable field 106e is set to a first value (e.g., 1), the host 102 may allow surprise hot plug for the port 104; and if the surprise hot plug enable/disable field 106e is set to a second value (e.g., 0), the host 102 may not allow surprise hot plug for the port 104. The hot plug enable/disable field 106e may be a user configurable parameter, and/or may be configured by the host 102.

In some embodiments, the host 102 may comprise a device state transition circuitry 108d (also referred to as circuitry 108d). The circuitry 108d may control a state of operation for the port 104. The port 104 may be, for example, in one of a L0 operating state, a L1 or low power state, a detect quiet state, a detect active state, and/or the like. The circuitry 108d may control a current state of the port 104.

The L0 operating state may correspond to an active or normal operating state of the port 104, e.g., when the host 102 actively communicates with the device 120 via the port 104. The L1 operating state may correspond to a low power or sleep state of the port 104. A detect quiet state of the port 104 may refer to a state where the circuitry 108a and/or 108b refrains from detecting if the port 104 is occupied or unoccupied. A detect active state of the port 104 may refer to a state where the circuitry 108a and/or 108b detects if the port 104 is occupied or unoccupied. For example, if the port is unoccupied and a device is newly attached to the port 104, the host 102 may detect that the device is newly attached during the detect active state, and not during the detect quiet state.

In some embodiments, the host 102 may comprise an interruption generation circuitry 108e (also referred to as circuitry 108e). The circuitry 108e may generate interruption signal (e.g., a Message Signaled Interrupt or MSI), as will be discussed in further details herein later. An interrupt handler (not illustrated in FIG. 1) may act of the interrupt, e.g., by executing one or more associated routines. In some embodiments, an interruption may be generated when the PRSDCH 106d is set (e.g., indicating a change of the state of the port 104 from occupied to unoccupied, or indicating a change of the state of the port 104 from unoccupied to occupied).

In some embodiments, the host 102 may further comprise a control circuitry 108f (also referred to as circuitry 108f). The circuitry 108f may control one or more operations of the PCIe port 104.

Although FIG. 1 illustrates various circuitries 108a, . . . , 108f, in some embodiments, one or more of these circuitries may be combined in a combined circuitry. For example, a single circuitry may perform operations of one or more of these circuitries. In some embodiments, one or more of these circuitries may be a part of a Link Training and Status State Machine (LTSSM) of the host 102.

Conventionally (e.g., in a host that does not selectively ignore the OB field 106a), the presence detect field 106c may be updated based on the OB field 106a and the IB field 106b. For example, if both the OB field 106a and the D3 field 106b detect that a device has been removed from the port 104, then the presence detect field 106c may indicate that the device has been removed from the port 104. For example, if either of the OB field 106a or the D3 field 106b detect that a device is attached to the port 104, then the presence detect field 106c may indicate that the device is attached to the port 104. Thus, conventionally, the presence detect field 106c may perform an "OR"ing operation of the OB field 106a and the IB field 106b, to detect if a device is attached to the port 104.

In some embodiments, the PRSDCH 106d may be asserted when the presence detect field 106c is changed. For example, when the presence detect field 106c is changed from 0 to 1, or from 1 to 0, the PRSDCH 106d may be asserted or set. The PRSDCH 106d may be cleared or de-asserted, for example, by the circuitry 108f (or by another appropriate circuitry of the host 102). In some embodiments, the interruption generation circuitry 108e generates an interrupt (e.g., a MSI) when the PRSDCH 106d is asserted or set.

In some embodiments, there may not be any explicit presence detect field 106c in the host 102, and the PRSDCH 106d may be selectively asserted, e.g., based on the D3 field 106b and/or the OB field 106a. For example, various embodiments are discussed herein, in which the PRSDCH 106d may be asserted based on the D3 field 106b, and not based on the OB field 106a (e.g., if surprise hot plug in enabled for the port 104). Put differently, if surprise hot plug in enabled for the port 104, the OB field 106a may be ignored while setting the PRSDCH 106d—the PRSDCH 106d may be set based on the IB field 106b.

In some embodiments, the port 104 may be in a low power state, e.g., the L1 state (e.g., one of various sub-states of the L1 state). In an example, in a conventional host (e.g., if the host 102 were to operate conventionally, without selectively ignoring the OB field 106a), the surprise hot plug may not work properly, e.g., if a device is removed from the port 104 while the port 104 was in the L1 state. For example, assume that the host 102 is to operate conventionally, without selectively ignoring the OB field 106a. Once a device is removed (e.g., by a surprise hot remove process) from the port 104 while the port 104 is in the L1 state, there is a possibility that the device (or another device) is re-attached to the port 104 via a hot add process. Thus, in this example, a surprise hot remove process may be followed by a surprise hot attach process, while the port 104 is in the L1 state. In such an example, as the port 104 is in L1 state, the D3 circuitry 108b may not continuously monitor the data ink 110a, and may not know that the surprise hot remove process was followed by the surprise hot attach process. On the other hand, the OB circuitry 108a may notice, even in the L1 state, that the surprise hot removal process occurred, and then the surprise hot attachment process occurred. So, after the surprise hot attachment process occurred, the OB field 106a may indicate that a device is currently attached to the port 104. On the other hand, once the port 104 exits the L1 state (e.g., in response to the hot attach process), the IB field 106b may provide a delayed indication of a surprise hot removal process. Thus, the OB field 106a and the TB field 106b may not be synchronized. The presence detect field 106c may, in such a case, indicate that the port 104 is occupied. The PRSDCH field 106d may be changed, but the port 104 may be occupied, e.g., as discussed in further details with respect to FIG. 2. In another example, the PRSDCH field 106d may not get set, because the OB field 106a may get asserted before the D3 field 106b may got de-asserted. In some scenarios, the above discussed issues may prevent a user from using surprise hot plug in a conventional system, e.g., when the port 104 is in the L1 state. The user may have to either disable the L1 state when performing a surprise hot plug, or may have to disable surprise hot plug.

Figure 2:
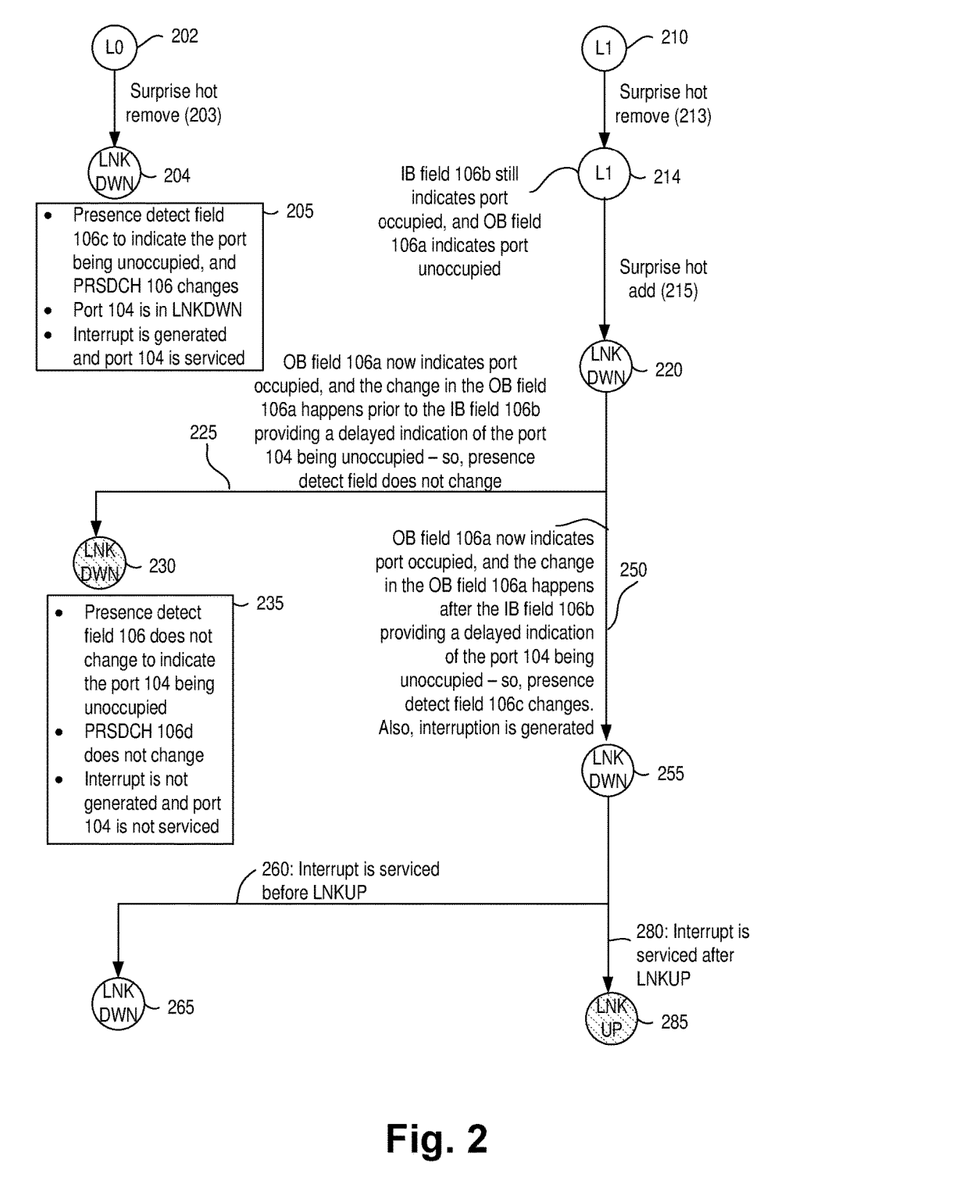
FIG. 2 illustrates scenarios associated with surprise hot plugs when a host is to operate without selectively ignoring an out-of-band (OB) field, and without delaying transition from a detect quiet state to a detect active state, according to some embodiments.

FIG. 2 illustrates scenarios associated with surprise hot plugs when the host 102 of FIG. 1 is to act conventionally (e.g., the host 102 is to operate without selectively ignoring the OB field 106a, and without delaying transition from a detect quiet state to a detect active state), according to some embodiments.

Blocks 202-205 of FIG. 2 are associated with operations of the host 102 when the port 104 is in L0 state and the host 102 operates conventionally (e.g., the host 102 is to operate without selectively ignoring the OB field 106a, and without delaying transition from a detect quiet state to a detect active state). At 202, the port 104 is in the L0 state. At 203, a surprise hot remove occurs, where a device (e.g., the device 120) is removed from the port 104. At 204, the port 104 is in the LNKDWN state. For example, as explained in the block 205, as the port 104 is in the L0 or active state, both the OB field 106a and D3 field 106b are updated to indicate the removal of the PCIe device from the port 104. Accordingly, the presence detect field 106c may also indicate that the link associated with the port 104 is down, and PRSDCH 106d may be asserted. The interruption generation circuitry 108e may generate an interrupt (e.g., a Message Signaled Interrupt or MSI), the port 104 may be serviced, and the PRSDCH 106d may be cleared. Subsequent hot addition, if any, may also be processed similarly in the L0 state.

Referring again to FIG. 2, blocks 210 onwards are associated with operations of the host 102 when the port 104 is in L1 state and the host 102 operates conventionally (e.g., the host 102 is to operate without selectively ignoring the OB field 106a, and without delaying transition from a detect quiet state to a detect active state). At 210, the port 104 is in the L1 state (e.g., a low power state). At 213, a surprise hot remove occurs, where a device (e.g., the device 120) is removed from the port 104.

At 214, the port 104 continues to be in the L1 state. At 214, as the port 104 is in the L1 state, the D3 circuitry 108b may not monitor the data link 110a, and may not be aware of the surprise hot remove 213. Accordingly, at 214, the IB field 106b may still indicate that the port 104 is occupied. The OB field 106a may indicate that the port 104 is unoccupied. For example, the OB circuitry 108a can update the OB field 106a even when the port 104 is in the L1 state.

At 215, there may be a surprise hot add (e.g., the device 120 or another PCIe device is plugged back in the port 104). At 220, due to the surprise hot addition, the PCIe link of the port may be down (e.g., LKNDWN at 220). From the block 220, there may be two possible scenarios, illustrated by the bifurcation in the flow path after the bock 220.

For example, in a first scenario after block 220, at 225, the OB field 106a may now indicate that the port 104 is occupied (e.g., due to the hot add at 215). Thus, the OB field 106a may be asserted. The IB field 106b may, with some delay, finally indicate that the port 104 is unoccupied (e.g., in response to the surprise hot removal at 213). Thus, the D3 field 106b may be de-asserted. In the example first scenario, the change in the OB field 106a may occur prior to the change in the IB field 106b. Thus, the OB field 106a may be asserted prior to the de-assertion of the IB field 106b. As the presence detect field 106c may be an "OR"ing operation between the OB field 106a and the D3 field 106b in the example of FIG. 2 (e.g., where the host 102 operates conventionally), the presence detect field 106c may not change, and the PRSDCH 106d may not be set. Put differently, the presence detect field 106c may not indicate that the port 104 is unoccupied. Thus, at 230, the port 104 is still at the LKNDWN status. In an example, the presence detect field 106c does not change to indicate that the port 104 is unoccupied. As the presence detect field 106c does not change to indicate that the port 104 is unoccupied, the PRSDCH 106d is not asserted, and no interruption (e.g., MSI) is generated by the interruption generation circuitry 108e for servicing the link, as indicated by block 235. The block 230 is illustrated using shadings, as this state of the port 104 may be an erroneous state (e.g., as the interruption is not generated and port 104 is not serviced in response to the hot plug).

In a second example scenario that may follow block 220, at 250, the OB field 106a may now indicate that the port 104 is occupied (e.g., due to the hot add at 215). Thus, the OB field 106a may be asserted. The D3 field 106b may, with some delay, finally indicate that the port 104 is unoccupied (e.g., in response to the surprise hot removal at 213). Thus, the IB field 106b may be de-asserted. In the example second scenario, the change in the OB field 106a may subsequent to the change in the D3 field 106b. Thus, unlike the first scenario discussed above with respect to block 225, in the block 250 the OB field 106a may be asserted after the de-assertion of the D3 field 106b. Accordingly, the presence detect field 106c may change to indicate that the port 104 is unoccupied. Thus, at 250, interruption (e.g., MSI) may be issued by the interruption generation circuitry 108e. At 255, the port 104 may be in the link down (LNKDWN) state.

After the block 255, the operations may take one of two possible paths: a first path (e.g., including blocks 260 and 265) and a second path (e.g., including blocks 280 and 285). If the first path is followed, at 260, the interruption may be serviced before the link is up, and at 265 the link may be down after the interrupt is serviced. The link may eventually be up (not illustrated in FIG. 2), and execute as expected.

After the block 255, if the second path is followed, at 280, the interruption may be serviced after the link is up, and at 285 the link is up. Thus, in this case, the OB field 106a gets asserted after the IB field 106b gets asserted, and the PRSDCH 106d may be set, e.g., thereby leading to software notification through an interrupt (e.g., interrupt is generated). But the link comes up, e.g., before the interrupt is serviced. Thus, in this example, the software may execute a hot remove operation (e.g., because it sees the PRSDCH bit is set), but the hot remove operation is not followed by a hot add operation. The block 285 is illustrated using shadings, as this state of the port 104 may be an erroneous state (e.g., as execution of the hot remove routine is not followed by a hot add routine).

Thus, the conventional operation of the host 102 may lead to two possible erroneous states, e.g., as indicated by blocks 230 and 285. In some scenarios, the above discussed issues may prevent a user from using surprise hot plug in a conventional system, e.g., when the port 104 is in the L1 state. Thus, conventionally, the user may have to either disable the L1 state when performing a surprise hot plug, or may have to disable surprise hot plug.

Various embodiments of this disclosure may address the issues associated with the erroneous states discussed in FIG. 2. For example, in some embodiments, if surprise hot plug is enabled for the port 104 (e.g., if the surprise hot plug enable/disable field 106e is set), then the host 102 may consider the IB filed 106b, e.g., when determining the presence detect field 106c and/or the PRSCDH 106d. For example, the host 102 may ignore the OB field 106a while determining the presence detect field 106c and/or the PRSCDH 106d, as discussed herein in further details (e.g., with respect to FIG. 3).

In some embodiments, in addition to (or instead of) selectively ignoring the OB field 106a, when the IB field 106b is set (e.g., when the PRSDCH is asserted), then a transition of the port 104 from a detect quiet state (also referred to as "Detect.Quiet" state) to a detect active state (also referred to as "Detect.Active" state) may be delayed. For example, the device state transition circuitry 108d may delay the transition of the port 104 from the detect quiet state to the detect active state, e.g., until the PRSDCH 106d is cleared, as discussed herein in further details. This may allow the host to detect when a PCIe device is removed from the port 104, and the port 104 does not proceed to the detect active state until the host 104 takes action associated with the device removal from the port 104 (e.g., with respect to FIG. 3).

Figure 3:
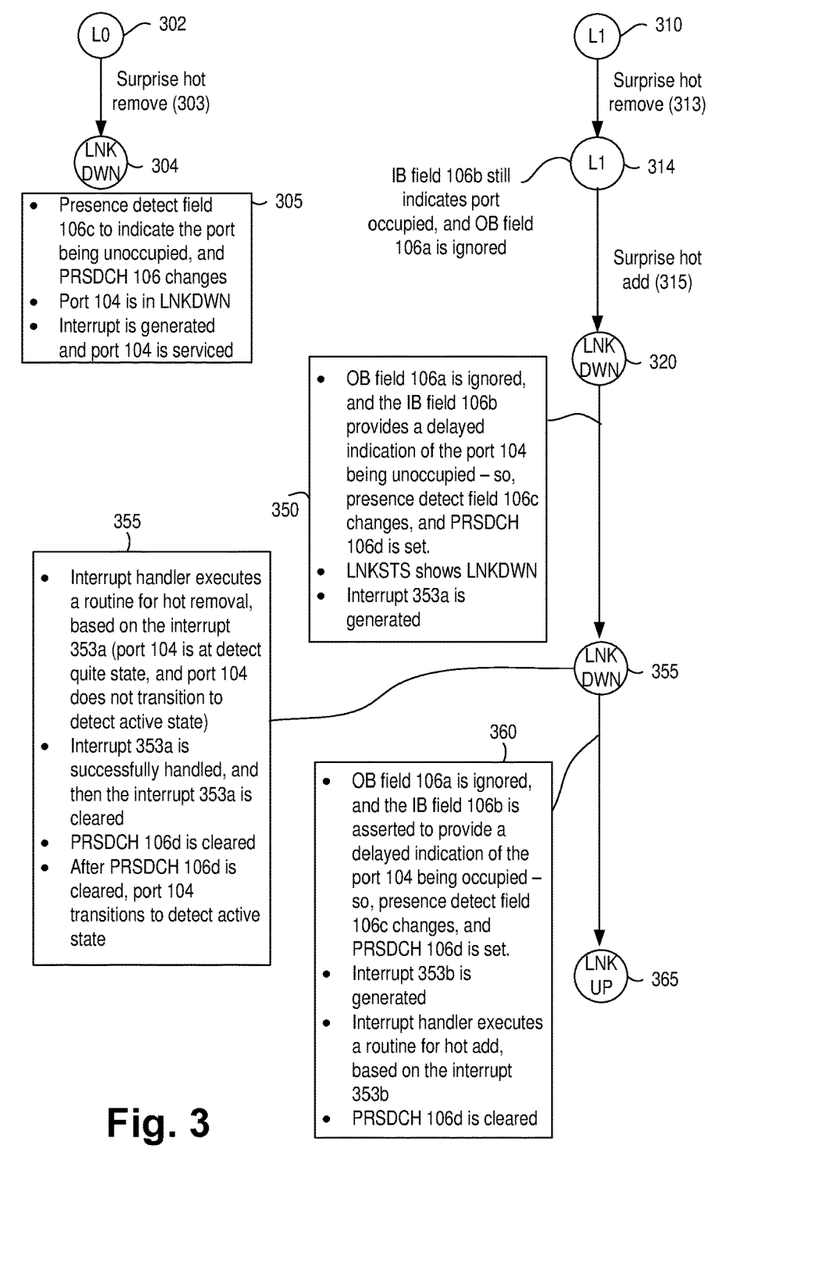
FIG. 3 illustrates scenarios associated with surprise hot plugs when a host is to selectively ignore the OB field, and is to selectively delay a transition from a detect quiet state to a detect active state, according to some embodiments.

FIG. 3 illustrates scenarios associated with surprise hot plugs when the host 102 of FIG. 1 is to selectively ignore the OB field 106a, and is to selectively delay a transition from a detect quiet state to a detect active state, according to some embodiments. In FIG. 3, the surprise hot plug is assumed to be enabled in the host 102 for the port 104 (e.g., the surprise hot plug enable/disable field 106e is set). Thus, in the examples discussed with respect to FIG. 3, the host 102 may consider the D3 filed 106b (and ignore the OB field 106a), e.g., when determining the presence detect field 106c and/or the PRSCDH 106d. In some embodiments, the OB field 106a may be updated by the OB circuitry 108a, but ignored by the host 102. In some other embodiments, the OB field 106a may not be updated by the OB circuitry 108a.

In FIG. 3, blocks 302-305 are associated with operations of the host 102 when the port 104 is in L0 state. At 302, the port 104 is in the L0 state. At 303, a surprise hot remove occurs, where a device (e.g., the device 120) is removed from the port 104. At 304, the port 104 is in the LNKDWN state. For example, as explained in the block 305, as the port 104 is in the L0 or active state, at least the D3 field 106b is updated to indicate the removal of the PCIe device from the port 104. As discussed herein above, the OB field 106a may be updated by the OB circuitry 108a but ignored by the host 102, or the OB field 106a may not be updated by the OB circuitry 108a. However, based on the D3 field 106b being updated to indicate the removal of the PCIe device from the port 104 (e.g., based on the IB field 106b being de-asserted), the presence detect field 106c may also indicate that the link associated with the port 104 is down. Accordingly, the PRSDCH 106d may be set. The interruption generation circuitry 108e may generate an interrupt (e.g., a Message Signaled Interrupt or MSI), and the port 104 may be serviced in response to the hot removal, and then the PRSDCH may be cleared.

Subsequent hot additions that may possible occur after block 304 may also be processed similarly in the L0 state. For example, eventually when another device is plugged in the port 104, the LTSSM may exit the detect state, the D3 field 106b may be asserted, and the presence detect field 106c may be asserted accordingly. Hence, the PRSDCH 106d may be set, causing another software notification and generation of an interruption. The interrupt handler may execute the hot add routine, the PRSDCH 106d may be cleared, and the link may be up.

Now referring to block 310, the port is assumed to be in L1 state. At 313, a surprise hot remove occurs, where a device (e.g., the device 120) is removed from the port 104.

At 314, the port 104 may continue to be in the L1 state. At 314, as the port 104 is in the L1 state, the D3 circuitry 108b may not monitor the data link 110a, and may not be aware of the surprise hot remove 313. Accordingly, at 314, the D3 field 106b may still indicate that the port 104 is occupied. The OB field 106a may indicate that the port 104 is unoccupied (or may not be updated at all), but such indication may be ignored by the host 102 in updating the fields 106c and/or 106d.

Although not illustrated in FIG. 3, after a hot remove operation (e.g., at 314, and prior to any hot add operation), if the host 102 tries to send transactions to the port 104 (e.g., while the port 104 is not occupied), then the link of the port 104 may be down (e.g., LNKDWN), and the D3 field 106b may be de-asserted, thereby causing the presence detect field 106c and the PRSDCH 106d to be set. Accordingly, an interrupt may be generated, and an interrupt handler may execute the hot remove routine, and the link may be serviced. This flow is not illustrated in FIG. 3.

Referring back to FIG. 3, at 315, there may be a surprise hot add (e.g., the device 120 or another PCIe device may be plugged back in the port 104). At 320, due to the surprise hot addition, the PCIe link of the port may be down (e.g., LKNDWN at 320), e.g., and the port 104 may be in a detect state. For example, when the device is plugged in at 315 in the port 104, the port 104 may try to come up through recovery. But since the link partner (e.g., the device attached to the port 104) tries to link up from detect, the port 104 may time out, and may transition to a detect state.

At 350, which occurs subsequent to block 320, the D3 field 106b is de-asserted. Thus, the IB field 106b may provide a delayed indication of the port 104 being unoccupied due to the hot removal at 313. Unlike FIG. 2, in block 350, the state of OB field 106a may be ignored. As the OB field 106a is ignored and as the IB field 106b is de-asserted, the presence detect field 106c may change, and PRSDCH 106d may be set or asserted. In an example, LNKSTS may now show LNKDWN. As the PRSDCH 106d is set, the interruption generation circuitry 108e may generate an MSI interrupt 353a, which may be sent out for servicing. Thus, the interrupt 353a may be for servicing the link of the port 104, to service the link 104 for the surprise hot remove operation at 313.

At 355, the port 104 may still be in LNKDWN state. In some embodiments, the LTSSM (e.g., which may be implemented using one or more of the circuitries 108) may wait, e.g., until the interrupt 353a is serviced and the interrupt 353a is cleared. For example, at 355, an interrupt handler may execute a routine associated with the hot remove operation (e.g., based on the interrupt 353a). In some embodiments, while the interrupt handler is executing the routine for hot removal, the port 104 may be forced to stay in the detect quiet state (e.g., a state in which the port 104 does not detect the hot addition of 315). For example, in the detect quiet state, the D3 circuitry 108b does not update the IB presence detect field 106b. Thus, in some embodiments, the host 102 may prevent the port 104 from transitioning to the detect active state (e.g., a state in which the port 104 can detect the hot addition of 315), until the interrupt handler executes the hot removal routine and clears the PRSDCH 106d.

Once the interrupt handler executes the routine associated with the hot remove operation, the interrupt handler may clear the interrupt 353a, and the PRSDCH 106d may also be cleared. In some embodiments, the port 104 may transition to the detect active state, e.g., only after the PRSDCH 106d is cleared. For example, until the PRSDCH 106d is cleared, the port 104 may remain at the detect quiet state, and may not detect the hot add of 315. Thus, in some embodiments, the host 102 may delay the transition from the detect quiet state to the detect active state, e.g., until the interrupt 353a is fully services and the PRSDCH 106d is cleared.

At 360 (e.g., after the PRSDCH 106d is cleared at 355), the port 104 may transition in the detect active state, and the IB field 106b may be asserted to provide a delayed indication of the port 104 being occupied (e.g., based on the hot add at 315). The OB field 106a may still be ignored. So, presence detect field 106c may change to indicate that the port 104 is occupied, and PRSDCH 106d may be set or asserted. Accordingly, an MSI interrupt 353b may be generated. The interrupt handler may execute a routine for hot addition (e.g., based on the interrupt 353b corresponding to the hot add at 315). Once the interrupt 353b is serviced, the PRSDCH 106d may be cleared. Accordingly, at 365, the link of the port 104 may be up with the device added via the hot add at 315.

Thus, in some embodiments, ignoring the OB field 106a in FIG. 3 may prevent occurrence of the erroneous state that occurred in the block 230 of FIG. 2. Also, in some embodiments, delaying the transition from the detect quiet state to the detect active state (e.g., as discussed with respect to block 355) in FIG. 3 may prevent occurrence of the erroneous state that occurred in the block 285 of FIG. 2.

Figure 4:
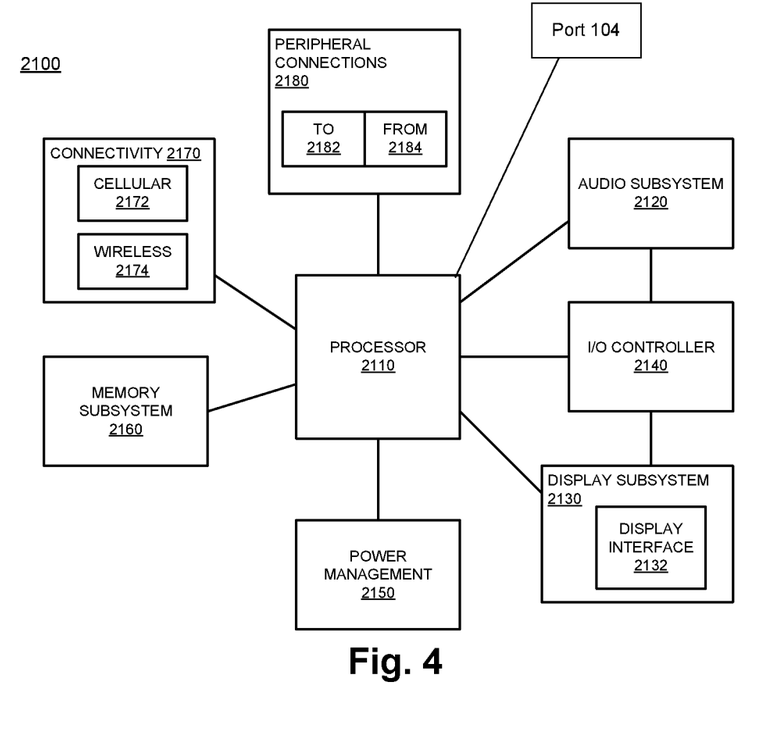
FIG. 4 illustrates a computer system, computing device or a SoC (System-on-Chip) including the port of FIG. 1, where when a surprise hot plug for the port is enabled, the computing device may selectively ignore an OB field, and is to selectively delay a transition from a detect quiet state to a detect active state of the port, in accordance with some embodiments.

FIG. 4 illustrates a computer system, computing device or a SoC (System-on-Chip) 2100 including the port 104 of FIG. 1, where when a surprise hot plug for the port 104 is enabled, the computing device 2100 may selectively ignore the OB field 106a, and is to selectively delay a transition from a detect quiet state to a detect active state of the port 104, in accordance with some embodiments. It is pointed out that those elements of FIG. 4 having the same reference numbers (or names) as the elements of any other figure can operate or function in any manner similar to that described, but are not limited to such.

In some embodiments, computing device 2100 represents an appropriate computing device, such as a computing tablet, a mobile phone or smart-phone, a laptop, a desktop, an IOT device, a server, a set-top box, a wireless-enabled e-reader, or the like. It will be understood that certain components are shown generally, and not all components of such a device are shown in computing device 2100.

In some embodiments, computing device 2100 includes a first processor 2110. The various embodiments of the present disclosure may also comprise a network interface within 2170 such as a wireless interface so that a system embodiment may be incorporated into a wireless device, for example, cell phone or personal digital assistant.

In one embodiment, processor 2110 can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O (input/output) with a human user or with other devices, operations related to power management, and/or operations related to connecting the computing device 2100 to another device. The processing operations may also include operations related to audio I/O and/or display I/O.

In one embodiment, computing device 2100 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2100, or connected to the computing device 2100. In one embodiment, a user interacts with the computing device 2100 by providing audio commands that are received and processed by processor 2110.

Display subsystem 2130 represents hardware (e.g., display devices) and software (e.g., drivers) components that provide a visual and/or tactile display for a user to interact with the computing device 2100. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 2100 through which a user might interact with the system. For example, devices that can be attached to the computing device 2100 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of the computing device 2100. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 2100 to provide I/O functions managed by I/O controller 2140.

In one embodiment, I/O controller 2140 manages devices such as accelerometers, cameras, light sensors or other environmental sensors, or other hardware that can be included in the computing device 2100. The input can be part of direct user interaction, as well as providing environmental input to the system to influence its operations (such as filtering for noise, adjusting displays for brightness detection, applying a flash for a camera, or other features).

In one embodiment, computing device 2100 includes power management 2150 that manages battery power usage, charging of the battery, and features related to power saving operation. Memory subsystem 2160 includes memory devices for storing information in computing device 2100. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 2100. In one embodiment, computing device 2100 includes a clock generation subsystem 2152 to generate a clock signal.

Elements of embodiments are also provided as a machine-readable medium (e.g., memory 2160) for storing the computer-executable instructions (e.g., instructions to implement any other processes discussed herein). The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 2100 to communicate with external devices. The computing device 2100 could be separate devices, such as other computing devices, wireless access points or base stations, as well as peripherals such as headsets, printers, or other devices.

Connectivity 2170 can include multiple different types of connectivity. To generalize, the computing device 2100 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 2180 include hardware interfaces and connectors, as well as software components (e.g., drivers, protocol stacks) to make peripheral connections. It will be understood that the computing device 2100 could both be a peripheral device ("to" 2182) to other computing devices, as well as have peripheral devices ("from" 2184) connected to it. The computing device 2100 commonly has a "docking" connector to connect to other computing devices for purposes such as managing (e.g., downloading and/or uploading, changing, synchronizing) content on computing device 2100. Additionally, a docking connector can allow computing device 2100 to connect to certain peripherals that allow the computing device 2100 to control content output, for example, to audiovisual or other systems.

In addition to a proprietary docking connector or other proprietary connection hardware, the computing device 2100 can make peripheral connections 2180 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, various components illustrated in FIG. 1, for example, may be incorporated in one or more components of the computing device 2100 of FIG. 4. Merely as an example, the computing device 2100 may comprise the port 104. In some embodiments, the port 104 may be operated in the manner discussed with respect to FIG. 3. For example, when a surprise hot plug for the port 104 is enabled, the computing device 2100 may selectively ignore the OB field 106a, and is to selectively delay a transition from a detect quiet state to a detect active state of the port 104.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following example clauses pertain to further embodiments. Specifics in the example clauses may be used anywhere in one or more embodiments. All optional features of the apparatus described herein may also be implemented with respect to a method or process.

Example 1

An apparatus comprising: an input/output (I/O) port; a first circuitry to update an in-band presence detect field, based on communication via an in-band channel; a second circuitry to update an out-of-band presence detect field, based on communication via an out-of-band channel; and a third circuitry to update a presence detect state change field, wherein the third circuitry is to selectively ignore the out-of-band presence detect field and utilize the in-band presence detect field, while the third circuitry is to update the presence detect state change field.

Example 2

The apparatus of example 1 or any other example, further comprising: a fourth circuitry to enable or disable surprise hot plugging for the I/O port.

Example 3

The apparatus of example 1 or any other example, wherein: the third circuitry is to ignore the out-of-band presence detect field, based on the surprise hot plugging being enabled for the I/O port.

Example 4

The apparatus of any of examples 1-3 or any other example, wherein: the first circuitry is to update the in-band presence detect field, based on detecting, using communication via the in-band channel, if any device is added to or removed from the I/O port; and the second circuitry is to update the out-of-band presence detect field, based on detecting, using communication via the out-of-band channel, if any device is added to or removed from the I/O port.

Example 5

The apparatus of any of examples 1 or 3 or any other example, further comprising: a fourth circuitry to generate an interrupt, based on the presence detect state change field being asserted.

Example 6

The apparatus of example 5 or any other example, further comprising: a fifth circuitry to maintain a detect quiet state of the I/O port, until the interrupt is serviced and the presence detect state change field is cleared.

Example 7

The apparatus of example 6 or any other example, wherein: the fifth circuitry is to transition the I/O port to a detect active state, subsequent to the interrupt being serviced and the presence detect state change field being cleared.

Example 8

The apparatus of example 5 or any other example, wherein: the presence detect state change field is to be asserted, based on a surprise hot remove of a device from the I/O port.

Example 9

The apparatus of example 8 or any other example, wherein the fifth circuitry is to maintain the detect quiet state of the I/O port, based on the surprise hot add followed by a surprise hot remove in the I/O port during a L1 state of the I/O port.

Example 10

The apparatus of any of examples 1-9 or any other example, wherein the I/O port is a Peripheral Component Interconnect Express (PCIe) port.

Example 11

A system comprising: a memory to store instructions; a processor coupled to the memory; an input/output (I/O) port, wherein the processor is to communicate with one or more devices via the I/O port; a first circuitry to assert a first field, based on a surprise hot remove in the I/O port, the first field to indicate a presence detect state change of the I/O port; and a second circuitry to maintain a detect quiet state of the I/O port, until the first field is de-asserted.

Example 12

The system of example 11 or any other example, further comprising: a third circuitry to generate an interrupt, based on the first field being asserted.

Example 13

The system of example 12 or any other example, further comprising: an interrupt handler to execute a hot remove routine, based on the interrupt, wherein the first field is de-asserted subsequent to the execution of the hot remove routine.

Example 14

The system of any of examples 11-13 or any other example, wherein: the second circuitry is to cause the I/O port to transition to a detect active state, subsequent to the first field being de-asserted.

Example 15

The system of example 14 or any other example, further comprising: a third circuitry to assert an in-band presence detect field, based on a surprise hot add in the I/O port and subsequent to the I/O port is to transition to the detect active state.

Example 16

The system of any of examples 11-15 or any other example, wherein the I/O port is a Peripheral Component Interconnect Express (PCIe) port.

Example 17

An apparatus comprising: an input/output (I/O) port; a first circuitry to update a presence detect state change field (PRSDCH) associated with the I/O port; and a second circuitry to delay transition from a detect quiet state of the I/O port to a detect active state of the I/O port, based on a state of the PRSDCH.

Example 18

The apparatus of example 17 or any other example, wherein the second circuitry is to delay transition from the detect quiet state to the detect active state, until the PRSDCH is cleared.

Example 19

The apparatus of example 18 or any other example, wherein the second circuitry is to delay transition from the detect quiet state to the detect active state, while the PRSDCH is being asserted.

Example 20

The apparatus of any of examples 17-19 or any other example, wherein the I/O port is a Peripheral Component Interconnect Express (PCIe) port.

Example 21

A method comprising: updating an in-band presence detect field associated with an input/output (I/O) port, based on communication via an in-band channel; updating an out-of-band presence detect field, based on communication via an out-of-band channel; and updating a presence detect state change field, wherein updating the presence detect state change field comprises: selectively ignoring the out-of-band presence detect field and utilizing the in-band presence detect field, while updating the presence detect state change field.

Example 22

The method of example 21 or any other example, further comprising: selectively enabling or disabling surprise hot plugging for the I/O port.

Example 23

The method of example 22 or any other example, further comprising: ignoring the out-of-band presence detect field while updating the presence detect state change field, based on surprise hot plugging being enabled for the I/O port.

Example 24

The method of example 21 or any other example, wherein: updating the in-band presence detect field comprises: updating the in-band presence detect field, based on detecting, using communication via the in-band channel, if any device is added to or removed from the I/O port; and updating the out-of-band presence detect field comprises: updating the out-of-band presence detect field, based on detecting, using communication via the out-of-band channel, if any device is added to or removed from the I/O port.

Example 25

The method of any of examples 21-24 or any other example, further comprising: generating an interrupt, based on the presence detect state change field being asserted.

Example 26

The method of any of examples 21-24 or any other example, wherein the I/O port is a Peripheral Component Interconnect Express (PCIe) port.

Example 27

A method comprising: communicating, via an input/output (I/O) port, with one or more devices; asserting a first field, based on a surprise hot remove in the I/O port, the first field to indicate a presence detect state change of the I/O port; and maintaining a detect quiet state of the I/O port, until the first field is de-asserted.

Example 28

The method of example 27 or any other example, further comprising: generating an interrupt, based on the first field being asserted.

Example 29

The method of example 28 or any other example, further comprising: executing a hot remove routine, based on the interrupt; and de-asserting the first field, subsequent to the execution of the hot remove routine.

Example 30

The method of any of examples 27-29 or any other example, further comprising: causing the I/O port to transition to a detect active state, subsequent to the first field being de-asserted.

Example 31

The method of example 30 or any other example, further comprising: asserting an in-band presence detect field, based on a surprise hot add in the I/O port and subsequent to the I/O port is to transition to the detect active state.

Example 32

A method comprising: updating a presence detect state change field (PRSDCH) associated with an input/output (I/O) port; and delaying transition from a detect quiet state of the I/O port to a detect active state of the I/O port, based on a state of the PRSDCH.

Example 33

The method of example 32 or any other example, wherein delaying the transition from the detect quiet state to the detect active state comprises: delaying the transition from the detect quiet state to the detect active state, until the PRSDCH is cleared.

Example 34

The method of example 33 or any other example, wherein delaying the transition from the detect quiet state to the detect active state comprises: delaying the transition from the detect quiet state to the detect active state, while the PRSDCH is being asserted.

Example 35

The method of any of examples 32-34 or any other example, wherein the I/O port is a Peripheral Component Interconnect Express (PCIe) port.

Example 36

One or more non-transitory computer-readable storage media to store instructions that, when executed by a processor, cause the processor to execute a method of any of the examples 21-35 or any other example.

Example 37

An apparatus comprising: means for performing the method of any of the examples 21-35 or any other example.

Example 38

An apparatus comprising: means for updating an in-band presence detect field associated with an input/output (I/O) port, based on communication via an in-band channel; means for updating an out-of-band presence detect field, based on communication via an out-of-band channel; and means for updating a presence detect state change field, wherein the means for updating the presence detect state change field comprises: means for selectively ignoring the out-of-band presence detect field and utilizing the in-band presence detect field, while updating the presence detect state change field.

Example 39

The apparatus of example 38 or any other example, further comprising: means for selectively enabling or disabling surprise hot plugging for the I/O port.

Example 40

The apparatus of example 39 or any other example, further comprising: means for ignoring the out-of-band presence detect field while updating the presence detect state change field, based on surprise hot plugging being enabled for the I/O port.

Example 41

The apparatus of example 38 or any other example, wherein: the means for updating the in-band presence detect field comprises: means for updating the in-band presence detect field, based on detecting, using communication via the in-band channel, if any device is added to or removed from the I/O port; and the means for updating the out-of-band presence detect field comprises: means for updating the out-of-band presence detect field, based on detecting, using communication via the out-of-band channel, if any device is added to or removed from the I/O port.

Example 42

The apparatus of any of examples 38-41 or any other example, further comprising: means for generating an interrupt, based on the presence detect state change field being asserted.

Example 43

The apparatus of any of examples 38-41 or any other example, wherein the I/O port is a Peripheral Component Interconnect Express (PCIe) port.

Example 44

An apparatus comprising: means for communicating, via an input/output (I/O) port, with one or more devices; means for asserting a first field, based on a surprise hot remove in the I/O port, the first field to indicate a presence detect state change of the I/O port; and means for maintaining a detect quiet state of the I/O port, until the first field is de-asserted.

Example 45

The apparatus of example 44 or any other example, further comprising: means for generating an interrupt, based on the first field being asserted.

Example 46

The apparatus of example 45 or any other example, further comprising: means for executing a hot remove routine, based on the interrupt; and means for de-asserting the first field, subsequent to the execution of the hot remove routine.

Example 47

The apparatus of any of examples 44-46 or any other example, further comprising: means for causing the I/O port to transition to a detect active state, subsequent to the first field being de-asserted.

Example 48

The apparatus of example 47 or any other example, further comprising: means for asserting an in-band presence detect field, based on a surprise hot add in the I/O port and subsequent to the I/O port is to transition to the detect active state.

Example 49

An apparatus comprising: means for updating a presence detect state change field (PRSDCH) associated with an input/output (I/O) port; and means for delaying transition from a detect quiet state of the I/O port to a detect active state of the I/O port, based on a state of the PRSDCH.

Example 50

The apparatus of example 49 or any other example, wherein the means for delaying the transition from the detect quiet state to the detect active state comprises: means for delaying the transition from the detect quiet state to the detect active state, until the PRSDCH is cleared.

Example 51

The apparatus of example 50 or any other example, wherein the means for delaying the transition from the detect quiet state to the detect active state comprises: means for delaying the transition from the detect quiet state to the detect active state, while the PRSDCH is being asserted.

Example 52

The apparatus of any of examples 49-51 or any other example, wherein the I/O port is a Peripheral Component Interconnect Express (PCIe) port.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
an input/output (I/O) port;
a first circuitry to update an in-band presence detect field, based on communication via an in-band channel;
a second circuitry to update an out-of-band presence detect field, based on communication via an out-of-band channel; and
a third circuitry to update a presence detect state change field,
wherein the third circuitry is to selectively ignore the out-of-band presence detect field and utilize the in-band presence detect field, while the third circuitry is to update the presence detect state change field.

2. The apparatus of claim 1, further comprising:
a fourth circuitry to enable or disable surprise hot-plugging for the I/O port.

3. The apparatus of claim 1, wherein:
the third circuitry is to ignore the out-of-band presence detect field, based on the surprise hot-plugging being enabled for the I/O port.

4. The apparatus of claim 1, wherein:
the first circuitry is to update the in-band presence detect field, based on detecting, using communication via the in-band channel, of any device being added to or removed from the I/O port; and
the second circuitry is to update the out-of-band presence detect field, based on detecting, using communication via the out-of-band channel, of any device being added to or removed from the I/O port.

5. The apparatus of claim 1, further comprising:
a fourth circuitry to generate an interrupt, based on the presence detect state change field being asserted.

6. The apparatus of claim 5, further comprising:
a fifth circuitry to maintain a detect quiet state of the I/O port, until the interrupt is serviced and the presence detect state change field is cleared.

7. The apparatus of claim 6, wherein:
the fifth circuitry is to transition the I/O port to a detect active state, subsequent to the interrupt being serviced and the presence detect state change field being cleared.

8. The apparatus of claim 5, wherein:
the presence detect state change field is to be asserted, based on a surprise hot remove of a device from the I/O port.

9. The apparatus of claim 8, wherein the fifth circuitry is to maintain the detect quiet state of the I/O port, based on a surprise hot add followed by the surprise hot remove in the I/O port during a L1 state of the I/O port.

10. The apparatus of claim 1, wherein the I/O port is a Peripheral Component Interconnect Express (PCIe) port.

11. A system comprising:
a memory to store instructions;
a processor coupled to the memory;
an input/output (I/O) port, wherein the processor is to communicate with one or more devices via the I/O port;
a first circuitry to assert a first field, based on a surprise hot remove in the I/O port, the first field to indicate a presence detect state change of the I/O port; and
a second circuitry to maintain a detect quiet state of the I/O port, until the first field is de-asserted.

12. The system of claim 11, further comprising:
a third circuitry to generate an interrupt, based on the first field being asserted.

13. The system of claim 12, further comprising:
an interrupt handler to execute a hot remove routine, based on the interrupt,
wherein the first field is de-asserted subsequent to an execution of the hot remove routine.

14. The system of claim 11, wherein:
the second circuitry is to cause the I/O port to transition to a detect active state, subsequent to the first field being de-asserted.

15. The system of claim 14, further comprising:
a third circuitry to assert an in-band presence detect field, based on a surprise hot add in the I/O port and subsequent to the I/O port is to transition to the detect active state.

16. The system of claim 11, wherein the I/O port is a Peripheral Component Interconnect Express (PCIe) port.

17. An apparatus comprising:
an input/output (I/O) port;
a first circuitry to update a presence detect state change field (PRSDCH) associated with the I/O port; and
a second circuitry to delay transition from a detect quiet state of the I/O port to a detect active state of the I/O port, based on a state of the PRSDCH,
wherein the second circuitry is to delay transition from the detect quiet state to the detect active state, from a time the PRSDCH is updated until a time the PRSDCH is cleared.

18. The apparatus of claim 17, wherein the second circuitry is to delay transition from the detect quiet state to the detect active state, while the PRSDCH is being asserted.

19. The apparatus of claim 17, wherein the I/O port is a Peripheral Component Interconnect Express (PCIe) port.

20. The apparatus of claim 17, wherein:
the PRSDCH is to indicate a change of a state of the I/O port from occupied to unoccupied, or to indicate a change of the state of the I/O port from unoccupied to occupied;
the PRSDCH is different from a presence detect field; and
the presence detect field is to indicate whether the I/O port is occupied or unoccupied.

* * * * *